United States Patent
Verbridge

[15] 3,640,583
[45] Feb. 8, 1972

[54] DUAL WHEEL FOR TRUCKS
[72] Inventor: Ralph Gary Verbridge, Williamson, N.Y.
[73] Assignee: Schovee & Boston, Rochester, N.Y. a part interest
[22] Filed: Aug. 27, 1969
[21] Appl. No.: 853,410

[52] U.S. Cl. ......................... 301/9 DN, 301/9 TV, 301/10 R, 301/38 R
[51] Int. Cl. ........................................................... B60b 3/02
[58] Field of Search ............. 301/11, 10, 9 TV, 36, 38, 9 DN, 301/63 R

[56] References Cited

UNITED STATES PATENTS

| | | | |
|---|---|---|---|
| 2,590,363 | 3/1952 | Adair | 301/9 DN |
| 1,496,019 | 6/1924 | Putnam | 301/63 |
| 1,880,641 | 10/1932 | Woodward | 301/36 |
| 2,416,862 | 3/1947 | Baker | 301/36 |
| 2,486,970 | 11/1949 | Nordenson | 301/9 |

Primary Examiner—Richard J. Johnson
Attorney—Schovee & Boston

[57] ABSTRACT

A wheel for a truck tire having a permanent first type of mounting means for attaching the wheel to a first type of truck wheel hub and also having a permanent second type of mounting means for alternatively attaching the wheel to a second type of truck wheel hub. The wheel includes a disc at one side of the wheel having a plurality of circumferentially spaced openings for receiving a plurality of circumferentially spaced bolts protruding from a disc-type hub. The wheel also includes an inwardly turned annular flange or lip at the opposite side of the wheel from the disc for attachment to a spider-type hub. The disc includes a plurality of large openings, one each corresponding to the number of bolts used when mounting the wheel by means of the lip, to accommodate a mounting tool or wrench therethrough.

3 Claims, 5 Drawing Figures

PATENTED FEB 8 1972

3,640,583

INVENTOR.
RALPH GARY VERBRIDGE

BY Schovee & Boston

ATTORNEYS

DUAL WHEEL FOR TRUCKS

BACKGROUND OF THE INVENTION

1. Field of the Invention

This invention relates generally to wheels and more particularly to a wheel having two mounting means whereby the wheel can be attached to either one of two completely different types of wheel hubs, i.e., a disc wheel hub and a spider wheel hub.

2. Description of the Prior Art

Many large trucks today employ two different types of wheels and wheel hubs. One type is known as a disc wheel having a disc on the outside thereof with a plurality of circumferentially spaced openings therein for accommodating a plurality of circumferentially arranged bolts in a disc type hub; this type of wheel is normally used for the front two tires. Another type of wheel is known as a spider wheel which comprises a circular rim having an annular, inwardly turned flange or lip; the spider wheel is attached by means of a plurality (for example five) of bolts each of which is used in conjunction with a wedge member that is forced, by the bolt, up against the annular lip for securing the wheel to the hub. The rear wheels of trucks usually employ a spider wheel. One disadvantage of using two different types of wheels and wheel hubs on trucks is the necessity for carrying two different types of spares on the trucks.

SUMMARY OF THE INVENTION

A wheel for truck tires having two different types of mounting apparatuses such that the wheel will fit on either one of two different types of wheel hubs, whereby only a single spare need be carried on trucks of the type using two different types of wheel-wheel hub combinations. The wheel includes a disc for attachment to disc wheel hubs, and an inwardly turned flange or lip for attachment to spider-type wheel hubs.

BRIEF DESCRIPTION OF THE DRAWING

The present invention will be more fully understood by reference to the following detailed description thereof, when read in conjunction with the attached drawing, wherein like reference numerals refer to like elements and wherein.

DETAILED DESCRIPTION OF THE PRESENT INVENTION

Figure 1:
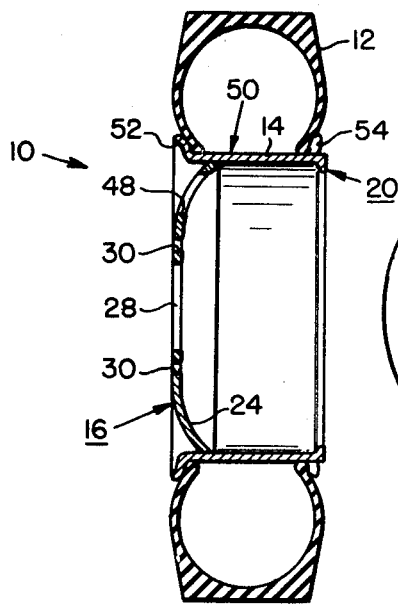
FIG. 1 is a cross-sectional view through the wheel of the present invention.
Figure 4:
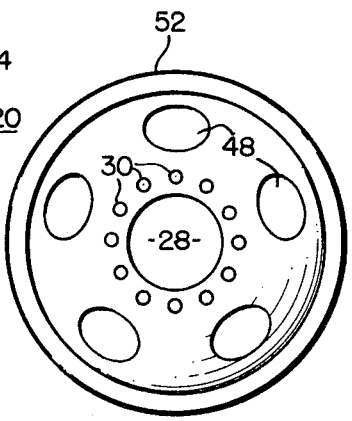
FIG. 4 is a side view of one side of the wheel of the present invention.
Figure 5:
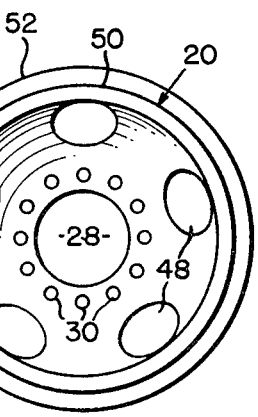
FIG. 5 is a side view of the other side of the wheel of the present invention.

Referring to the drawing, the apparatus of the present invention comprises a wheel 10 on which a tire 12 can be mounted in the normal manner. The wheel 10 comprises an annular wheel body 14 in the shape of a circular ring or rim, a first mounting means 16 for mounting the wheel 10 on one type of hub 18 (see FIG. 2), and a second mounting means 20 for mounting the wheel 10 on another type of hub 22 (see FIG. 3).

Figure 2:
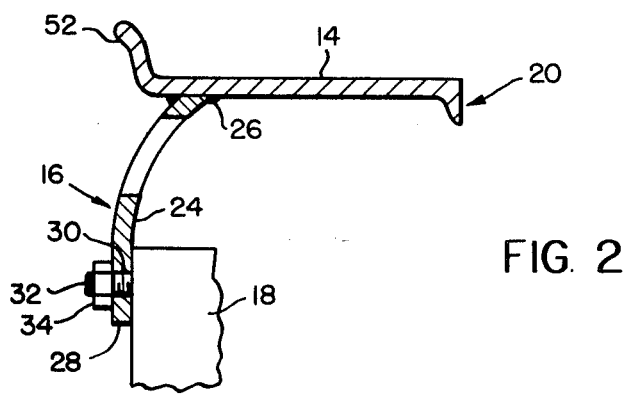
FIG. 2 is a partial cross-sectional view through the wheel of the present invention showing the wheel attached to one type of hub.

Referring to FIG. 2, a wheel having only mounting means 16 is known as a disc-type wheel. The mounting means 16 is connected to the wheel body 14 at substantially one side thereof (the left side as viewed in the drawing) and comprises a disc 24 welded at 26 to the wheel body 14 and having a central opening 28 therein. As used in the present specification and claims the term "side" as applied to an annular wheel body 14 means the left or right side as viewed in FIG. 1, e.g., the mounting means 16 is connected to the left side and the mounting means 20 is connected to the right side of the wheel body 14. When the wheel 10 is attached to a hub, one side is the inside and the other side is the outside. In addition to the opening 28, the disc 24 is provided with a plurality of substantially circumferentially and equally spaced-apart holes 30, each one being positioned to receive one of a plurality of bolts 32 projecting outwardly from the hub 18. A nut 34 is tightly threaded onto each of the bolts 32 to removably attach the wheel 10 to the hub 18 by use of the mounting means 16.

Figure 3:
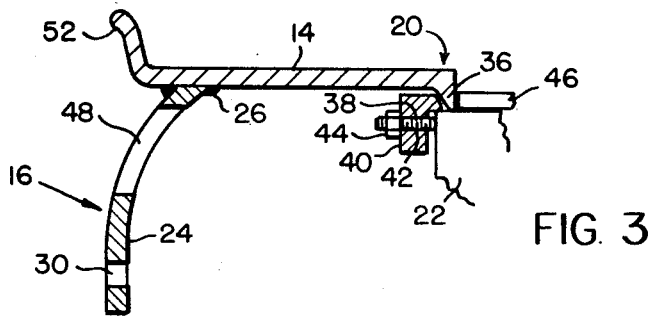
FIG. 3 is a partial cross-sectional view through the wheel of the present invention showing the wheel attached to a different type of hub.

Referring to FIG. 3, a wheel having only mounting means 20 is known as a spider wheel (or as a rim wheel for attachment to a spider type hub 18). The mounting means 20 is connected to the wheel body 14, according to the present invention, at the opposite side thereof from mounting means 16 and comprises an annular, inwardly extending flange or lip 36, preferably integral with the wheel body 14. The wheel 10 is attached to a spider-type hub 22 by use of the wheel-mounting means 20 as follows. The wheel 10 is slipped over the outside circumference of the hub 22 having a plurality of outwardly projecting bolts 38. A clamp or lug 40, having the shape shown in FIG. 3, and having a hole 42 therein, is slide over a bolt 38 with the bolt 38 passing through the hole 42. A nut 44 is then tightly threaded onto the bolt 38 to draw the clamp 40 tightly against the hub 22 and to hold the lip 36 tightly between the clamp 40 and a spacer 46, in the manner well known to those skilled in the art. The disc 24 is provided with a plurality of circumferentially spaced openings 48 to accommodate a mounting tool or wrench therethrough, oriented so that each one of the openings 48 is in line with or in register with one of the bolts 38. Some hubs 22 use five bolts and some a different number; the disc 24 should have the identical number of openings 48 as there are bolts 38 in the particular hub 22 to be used. The opening 28 provides access to the various elements to be manipulated while installing the wheel 10 on the hub 22. Thus, the disc 24 is not in the way when the wheel 10 is installed using mounting means 20.

The manner in which the tire 12 is mounted on the wheel 10 is the same as with prior art wheels. Briefly, the tire 12 is in contact with an outer surface 50 (FIG. 1) of the wheel 10 and is positioned between an outwardly projecting or upturned flange 52 and a split ring 54, as is well known in the art. The tire 12 and split ring 54 are not shown in FIGS. 2–5, for simplicity and to better show the structure of the invention.

It is noted that the wheel 10, with the disc 24 removed, is identical to known rim-type wheels for attachment to spider-type hubs. The disc 24, per se, is similar to the disc part of known disc-type wheels except for the above discussed orientation and size of the plurality of openings 48.

The invention has been described in detail with particular reference to preferred embodiments thereof, but it will be understood that variations and modifications can be effected within the spirit and scope of the invention as described hereinabove.

I claim:

1. The combination comprising:
   a. a spider wheel hub having a plurality of circumferentially spaced-apart lug bolts projecting axially out from said wheel hub; and
   b. a truck wheel mounted on said spider wheel hub and comprising:
      1. a demountable tire rim on which a tire can be mounted;
      2. first mounting means integrally connected to said tire rim for mounting said tire rim on a disc wheel hub, said first mounting means being connected to approximately one side of said tire rim, said first mounting means comprising a bolt-on disc having a plurality of substantially circumferentially and equally spaced-apart holes, each hole being adapted, and being positioned, to receive one of a plurality of bolts projecting from a disc wheel hub,
      3. second mounting means integrally connected to said tire rim and mounting said tire rim on said spider wheel hub, said second mounting means being connected to approximately the other side of said tire rim, said second mounting means comprising an annular, inwardly extending wheel mounting lip, mounted on said spider wheel hub with a clamp lug and a nut connected to each of said lug bolts for clamping against said wheel mounting lip, and 4. said bolt-on disc also including a plurality of circumferentially spaced-apart access openings extending therethrough, said access openings being oriented such that each of said lug bolts is substantially in register with an access opening.

2. The apparatus according to claim 1 wherein said bolt-on disc is substantially flat, is positioned in a plane substantially perpendicular to the axis of the tire rim, and is substantially aligned with said one side of said tire rim.

3. The apparatus according to claim 1 including a tire mounted on said tire rim, and wherein each of said access openings is sufficiently large to permit access to a lug bolt and nut in substantial registry therewith.

* * * * *